United States Patent
Hausmann et al.

(10) Patent No.: US 7,279,520 B2
(45) Date of Patent: Oct. 9, 2007

(54) FLAME RETARDANT, HALOGEN-FREE COMPOSITIONS

(75) Inventors: Karlheinz Hausmann, Auvernier (CH); Richard T. Chou, Hockessin, DE (US); Richard J. Arhart, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 344 days.

(21) Appl. No.: 10/997,283

(22) Filed: Nov. 24, 2004

(65) Prior Publication Data

US 2005/0137306 A1 Jun. 23, 2005

Related U.S. Application Data

(60) Provisional application No. 60/524,979, filed on Nov. 25, 2003.

(51) Int. Cl.
*C08L 23/08* (2006.01)
*C08L 23/06* (2006.01)
*C08K 3/22* (2006.01)

(52) U.S. Cl. .............. 524/401; 252/601; 252/603; 525/207; 525/221; 525/240

(58) Field of Classification Search ............ 524/401; 252/601, 603; 525/207, 221, 240
See application file for complete search history.

(56) References Cited

U.S. PATENT DOCUMENTS

| 4,351,931 | A | | 9/1982 | Armitage |
| 4,430,468 | A | | 2/1984 | Schumacher |
| 4,434,258 | A | | 2/1984 | Schumacher et al. |
| 4,673,620 | A | | 6/1987 | Shulman et al. |
| 4,701,359 | A | | 10/1987 | Akao |
| 4,948,669 | A | | 8/1990 | Rolland |
| 5,240,894 | A | | 8/1993 | Burkhardt et al. |
| 5,264,405 | A | | 11/1993 | Canich |
| 5,272,236 | A | | 12/1993 | Lai et al. |
| 5,276,272 | A | | 1/1994 | Lai et al. |
| 5,418,272 | A | * | 5/1995 | Kawabata et al. .......... 524/436 |
| 5,507,475 | A | | 4/1996 | Seel et al. |
| 5,859,137 | A | | 1/1999 | Chou |
| 5,889,114 | A | * | 3/1999 | Statz .......................... 525/166 |

FOREIGN PATENT DOCUMENTS

| EP | 0 212 575 A2 | | 3/1987 |
| EP | 0 893 469 A1 | | 1/1999 |
| EP | 893469 A1 | * | 1/1999 |
| JP | 05025331 A | * | 2/1993 |
| JP | 2003292696 A | * | 10/2003 |

* cited by examiner

*Primary Examiner*—Kelechi C. Egwim

(57) ABSTRACT

A flame retardant, halogen-free polymer composition that is a blend of: (1) a polyolefin selected from (a) EVA containing 25-90% by weight ethylene and 10-75% by weight vinyl acetate, (b) LLDPE, (c) LDPE, (d) VLDPE, (e) HDPE, or mixtures thereof; (2) a coupling agent made from (f) about 10 to about 50% by weight of a copolymer of ethylene and about 1% by weight to about 15% by weight functional comonomer and (g) about 50% by weight to about 90% by weight of an ethylene-based polymer; and (3) an inorganic flame retardant filler.

12 Claims, No Drawings

FLAME RETARDANT, HALOGEN-FREE COMPOSITIONS

This application claims the benefit of U.S. Provisional Application No. 60/524,979, filed Nov. 25, 2003, which is incorporated by reference herein for all purposes as if fully set forth.

BACKGROUND OF THE INVENTION

This invention relates to polymer compositions which are halogen-free and flame retardant, and to shaped articles made from them.

FIELD OF INVENTION

Polyvinyl chloride (PVC) products have been on the market for many years and are commonly used in a large variety of applications. With the trend toward a chlorine-free environment, certain market segments such as the construction and wires and cable industries are in need of an alternative to PVC. Several halogen-free flame retardant compounds are already available on the market but require difficult mixing processes. These compounds often need to be produced by specialized compounders, as the wire and cable and floor tile producers, themselves, often do not have the expertise.

For wire and cable applications, halogen-free flame retardant materials are desirable to provide both insulation and jacketing in low-voltage cables in areas where it is necessary to avoid the generation of hazardous gases in the event of fire. Such areas where halogen-free low-voltage cables are useful include hotels, hospitals, schools, theaters and other such public spaces.

Jacketing materials have to be highly flame retardant, have good heat performance and good physical properties.

U.S. Pat. Nos. 4,948,669, 4,430,468, 4,434,258, 4,673,620, 4,701,359 disclose PVC-free compositions that are suitable for use as coatings for electrical cables. Such compositions usually include a base polymer, either polyethylene or an ethylene-alpha olefin copolymer such as ethylene vinyl acetate, a halogen-free flame retardant filler, such as aluminum trihydrate or magnesium hydroxide, stabilizers and a coupling agent. The coupling agent can be based on a matrix polymer which is co-polymerized or grafted with an unsaturated carboxylic acid or an anhydride thereof.

The purpose of the coupling agent is to bind the flame retardant filler to the base polymer. This is necessary in view of the fact that the filler is needed at concentrations up to 60-70% by weight of the final composition so that, if not well bound to the base polymer, it can render the product very brittle.

These coupling agents can be generally described as copolymers of ethylene with optionally other polar monomers (acrylates, vinyl acetates) and a carboxylic acid or anhydride moiety which allows reaction with the flame retardant filler. There are known alternative coupling agents such as silanes, but they are used in very low concentrations and their dosing poses problems.

EP 0 893 469-A1 discloses a flame retardant, halogen-free polymer composition comprising a blend of (1) ethylene vinyl acetate carbon monoxide terpolymer; (2) an ethylene vinyl acetate or polyolefin, (3) a coupling agent which is an ethylene vinyl acetate or polyolefin grafted with a carboxylic acid or an anhydride thereof, and (4) an inorganic filler.

However, the compositions disclosed in the above prior art documents are characterized by high viscosity values so that processing and manufacture become difficult and expensive.

SUMMARY OF THE INVENTION

According to the present invention there is provided a flame retardant, halogen-free polymer composition comprising a blend of the following components:
(1) a polyolefin selected from the group consisting of (a) an ethylene vinyl acetate containing 25-90% by weight ethylene and 10-75% by weight vinyl acetate, (b) a linear low density polyethylene (LLDPE), (c) a low density polyethylene (LDPE), (d) a very low density polyethylene (VLDPE), (e) a high density polyethylene (HDPE), and mixtures thereof;
(2) a coupling agent comprising (f) from about 10 to about 50% by weight of a copolymer consisting of ethylene and one functional comonomer wherein the copolymer comprises from about 1% by weight to about 15% by weight of the functional comonomer and (g) from about 50% by weight to about 90% by weight of an ethylene-based polymer;
(3) an inorganic flame retardant filler;

and optionally further comprising common additives including for example antioxidants, titanium dioxide (for UV resistance and to give a white color to the product), processing aids like zinc stearate and UV stabilizers.

Component (2) provides, on the one hand, enhanced coupling between component (1), the polyolefin, and component (3), the inorganic flame retardant filler. This enhanced coupling is visible from the increased elongation compared to the uncompatibilized or uncoupled alloy. On the other hand, the component (2) reduces the viscosity. The low viscosity is apparent from the high melt flow index MFI of the compounds, which allows for better processability. Moreover, the component (2) is lower in price than other coupling agents on the market that are more difficult to process, thereby overcoming the shortcomings of the prior art.

Component (2), the coupling agent, uses a blend of a non-functionalized ethylene copolymer with one functional copolymer whose functionality is incorporated in the main polymer chain through copolymerization. This incorporation of the functionality by copolymerization contrasts with the use of grafted copolymers as in EP-A 0 893 469-A1. Also, this incorporation of the functionality by copolymerization enables the achievement of low MFI values in the composition of the invention.

The composition according to the present invention exhibits low viscosity and is easy and inexpensive to process.

DETAILED DESCRIPTION OF THE INVENTION

The present invention relates to flame retardant, halogen-free thermoplastic polymer compositions which are useful in wire and cable coatings or in sheet form such as for use in floor tiles. These compositions are formed by combining a polyolefin selected from ethylene vinyl acetate (EVA) copolymer, a linear low density polyethylene, a low density polyethylene, a very low density polyethylene which is a LLDPE having a specific density equal or below 0.920 g/cm$^3$, a high density polyethylene and mixtures thereof; a coupling agent comprising from about 10 to about 50% by weight of a copolymer of ethylene and one functional comonomer wherein the copolymer comprises from about 1% by weight to about 15% by weight of the functional comonomer, and from about 50% by weight to about 90% by weight of an ethylene-based polymer; and an inorganic flame retardant filler.

Polymer compositions according to the present invention can be formed into wire and cable coatings or sheet form for uses such as for floor tiles, and have many properties comparable to polyvinyl chloride (PVC) containing compositions, but are free from halogen. The inventive composition combines enhanced coupling with improved processing.

Unless otherwise stated, percentage weight ranges for each of the components in the composition of the present invention are calculated exclusive of any additives which may be present.

Component 1

The EVA copolymer when used as component (1) in this invention preferably contains 25-90% by weight of ethylene and 10-75% by weight of vinyl acetate, more preferably 55-75% by weight of ethylene and 15-30% by weight of vinyl acetate. In general, these EVA's have a melt flow index (MFI) in the range of 0.05-100 g/10 min., preferably less than 50 g/10 min. as determined by ASTM D-1238 (measured at 2, 16 kg and 190 DEG C) and are well known in the art.

Polyethylene when used as component (1) in general will have a melt flow index (MFI) in the range of 0.05-100 g/10 min., preferably less than 50 g/10 min. as determined by ASTM D-1238 (measured at 2, 16 kg and 190 DEG C) and are well known in the art.

Component (1) preferably makes up 1-60% by weight of the composition of the present invention, more preferably 5-35% by weight, still more preferably 10-20% by weight of the composition based on polymer components (1) and (2) and the inorganic flame retardant filler (3).

Component 2

Component (2) is a coupling agent comprising from about 10 to about 50% by weight of a copolymer of ethylene and one functional comonomer wherein the copolymer comprises from about 1% by weight to about 15% by weight of the functional comonomer, and from about 50% by weight to about 90% by weight of an ethylene-based polymer.

The first sub-component (f) of the coupling agent, component (2), can be a maleated polyolefin which is a copolymer of ethylene and maleic anhydride, or its functional equivalent. Such equivalents include derivatives of maleic anhydride such as maleic acid and/or salts thereof, maleic acid diesters, maleic acid monoesters, itaconic acid, fumaric acid, fumaric acid monoester, and/or mixtures of any of these. Maleic diesters or monoesters (maleic half-esters) include esters of C1-C4 alcohols, such as, for example, methyl, ethyl, n-propyl, isopropyl, and n-butyl alcohols. Preferably the maleated polyolefin includes ethylene and maleic anhydride, and/or maleic half-esters. More preferably the maleated polyolefin includes maleic anhydride and/or maleic half-esters, in particular monoethylmaleate (MAME).

Maleated polyolefins useful herein are obtained by a high pressure free radical polymerization process. A high pressure process suitable for use in the practice of the present invention is described, for example, in U.S. Pat. No. 4,351,931.

The coupling agent component (2) comprises as a second sub-component (g) an ethylene-based polymer (base resin).

The base resin can be: a high density polyethylene (HDPE); low density polyethylene (LDPE); linear low density polyethylene (LLDPE); ultra low density polyethylene (ULDPE); copolymers of ethylene and alpha-olefin monomer using a metallocene catalyst (metallocene polyethylene, or MPE); ethylene/propylene copolymer; or terpolymers such as ethylene/propylene/diene monomer (EPDM).

In addition, suitable base resins can include ethylene copolymers prepared from ethylene and a polar monomer. Such suitable copolymers include: ethylene acrylate copolymers and ethylene vinyl acetate copolymers, including ethylene acrylic acid copolymers, ethylene methacrylic acid copolymers, salts derivable from ethylene acrylic and/or methacrylic acid copolymers, ethylene acrylic ester copolymers, ethylene methacrylic ester copolymers, and/or mixtures of any of these. The ethylene acid copolymers can be described as E/X/Y copolymers where E is ethylene, X is the $\alpha,\beta$ ethylenically di-carboxylic acid derivatives, particularly maleic anhydride and monoester of maleic anhydride, and Y is a softening comonomer such as acrylate (methyl acrylate or butyl acrylate) or vinyl acetate.

Preferably, the base resin is a soft polymer. More preferably, the base resin is MPE, LLDPE, and ethylene copolymers of ethylene and acrylate. Most preferably, the base resin is MPE.

Without being held to theory, MPE can be preferred in the practice of the present invention because of its substantially linear structure and narrow molecular weight distribution. MPE technology is capable of making lower density MPE with high flexibility and low crystallinity, which can be desirable as the second component of this invention.

MPE technology is described in, for example, U.S. Pat. No. 5,272,236; U.S. Pat. No. 5,278,272, U.S. Pat. No. 5,507,475, U.S. Pat. No. 5,264,405, and U.S. Pat. No. 5,240,894.

The coupling agent component (2) includes from about 10 to about 50 wt %, based on the total weight of the coupling agent, of the ethylene maleic anhydride copolymer, or its functional equivalent. Preferably, the coupling agent includes from about 10 to about 45 wt % of the maleated polyolefin, more preferably the composition includes from about 15 to about 40 wt % of the maleated polyolefin, and most preferably from about 15 to about 35 wt % of the maleated polyolefin.

The coupling agent includes from about 50 to about 90 wt % of the ethylene-based polymer, based on the total weight of the coupling agent composition. Preferably the coupling agent includes from about 55 to about 90 wt %, more preferably from about 60 to about 85 wt %, and most preferably from about 65 to about 85 wt % of the ethylene-based polymer.

An example of the coupling agent falling under the general definition given above is a melt blend of EMAME (copolymer of ethylene and monoethylmaleate) and a copolymer of ethylene and alkylacrylate.

Thus, component (2), the coupling agent, uses as its first sub-component (f) a blend of a non-functionalised ethylene copolymer with one functional copolymer whose functionality is incorporated in the main polymer chain through copolymerization. A typical example is EMAME, ethylene copolymerised with monoethylmaleate, i.e. where the MAME functionality is incorporated by copolymerization. Another example is EMAH, a copolymer of ethylene and maleic anhydride, where the MAH functionality is also incorporated by copolymerization. This incorporation of the functionality of the functional copolymer by copolymerization contrasts with the use of grafted copolymers as in EP-A 0 893 469-A1, typified by EVA+MAH, ethylene vinyl acetate grafted with maleic anhydride. Also, this incorporation of the functionality by copolymerization enables the achievement of low MFI values in the composition of the invention, as will be demonstrated by the Examples below.

The coupling agent component (2) preferably makes up 1-50% by weight of the composition, preferably from 1-15% by weight of the total weight of components (1), (2) and (3).

Component 3

Component (3) is an inorganic flame retardant filler. Suitable fillers are known in the art. Specific, preferred inorganic flame retardant fillers include aluminum trihydrate, magnesium hydroxide, calcium carbonate, calcinated clay, talcum, ammonium polyphosphate and mixtures thereof. Other inorganic flame retardant fillers include ammoniumpolyphosphate and phosphorous melaminecyanurate alone or in combination with synergists such as zinc borate.

Component (3) preferably makes up 20-85% by weight of the composition of the present invention, more preferably 50-70% by weight, still more preferably 60-70% by weight of the composition based on polymer components and inorganic flame retardant fillers.

Additives

In addition to its polymer and inorganic flame retardant filler components, the composition of the present invention can be blended with common additives such as antioxidants, UV stabilizers, lubricants (e.g., oleamide), anti blocking agents, antistatic agents, waxes, pigments, titanium dioxide, talc and other processing aids (e.g., zinc stearate) known in the polymer compounding art. The additives may make up to about 10 weight percent of the total composition based on polymer components, flame retardant fillers and additives.

Blending

The compositions of the invention can be prepared by blending the polymeric ingredients flame retardant fillers and optional additives by use of conventional masticating equipment, for example, a rubber mill, Brabender Mixer, Banbury Mixer, Buss-Ko Kneader, Farrel continuous mixer or twin screw continuous mixer. Mixing times should be sufficient to obtain homogeneous blends and a proper reaction between maleic anhydride groups and the flame retardant fillers (component (3)). Typically, mixing times of about 5 minutes and mixing temperatures of 160° C. are satisfactory. If the polymer blend is non-homogeneous, additional mixing is required.

EXAMPLES

The invention can be further understood by the following examples in which parts and percentages are by weight and temperatures are in degrees Celsius.

TABLE 1

| Sample | 1 | 2 | 3 | 4 | 5 | 6 | 7 |
|---|---|---|---|---|---|---|---|
| (1)-1 EVA | 17.5 | 14.0 | 14.0 | 14.0 | 15.0 | 15.0 | 15.0 |
| (1)-2 PE | 17.5 | 14.0 | 14.0 | 14.0 | 15.0 | 15.0 | 15.0 |
| (2)-C1 | — | 7.0 | — | — | 5.0 | — | — |
| (2)-C2 | — | — | 7.0 | — | — | 5.0 | — |
| (2)-IN | — | — | — | 7.0 | — | — | 5.0 |
| (3)-Filler | 65 | 65 | 65 | 65 | 65 | 65 | 65 |

Table 1 shows the amounts in weight % of the components (1), (2) and (3) of seven different compositions identified as Samples 1-7.

In all samples component (1) consisted of a mixture of two sub-components (1)-1 and (1)-2. Sub-component (1)-1 was ethylene vinyl acetate (EVA) available under the Trademark ELVAX® 265 from E. I. du Pont de Nemours and Company. Sub-component (1)-2 was a linear low density polyethylene available under the trade designation PELLD-2045 from Dow Chemical Company.

Samples 2 and 5 contained a comparative coupling agent (2)-C1 of the type described in EP 0893 469-A1, which in this comparative example consisted of linear low density polyethylene with grafted MAH functionality, available from E. I. du Pont de Nemours and Company under the Trademark FUSABOND® MB226D.

Samples 3 and 6 contained a comparative coupling agent (2)-C2 consisting of a terpolymer of ethylene, acrylate and maleic anhydride EEMAH, available from Atofina under the Trademark LOTADER® 3420.

The coupling agent of Samples 4 and 7 was a low cost modifier according to the invention consisting of precompound based on 15 weight % of a copolymer of ethylene and 6 wt % monoethylmaleate (MAME) that had a MFI of 30 and that was made on an experimental high pressure reactor, and 85% of an ethylene-based polymer namely a copolymer of ethylene and 27 wt % butylene acrylate with a MFI of 4, available from E. I. du Pont de Nemours and Company under the Trademark ELVALOY® 3427 AC. The said precompound was prepared on a co-rotating twin screw extruder under standard conditions, namely a melt temperature setting between 150-200° C. while feeding the two components as a "salt and pepper" blend.

The inorganic filler, component (3), of all samples was aluminum trihydrate (ATH) available from Martinswerke GmbH under the Trademark Magnifin® OL 104LE.

In summary, Samples 1, 2, 3, 5 and 6 were comparative compositions, and Samples 4 and 7 represent examples according to the invention.

The samples 1-7 were prepared as indicated above under "Bonding" and were subjected to testing to measure their elongation at break, tensile strength and melt flow index (MFI). The elongation at break and tensile strength were measured by on a Zwick tensile testing machine, according to standard ISO 527-1. The MFI was measured according to ASTM 1246 at 160° C./21.6 kg. The resulting measurements for the respective samples are given in Table 2.

TABLE 2

| Sample | 1 | 2 | 3 | 4 | 5 | 6 | 7 |
|---|---|---|---|---|---|---|---|
| Elongation (%) | 12.0 | 49.0 | 40.0 | 40.0 | 51 | 25.0 | 25.0 |
| Tensile Strength (Mpa) | 9.7 | 12.9 | 15.7 | 15.7 | 15.2 | 12.7 | 11.6 |
| MFI @160° C./21.6 kg | 2.4 | 2.13 | 1.99 | 3.8 | 1.82 | 2.85 | 3.39 |

Comparative sample 1 had no coupling agent. It can be seen that the measured elongation at break, tensile strength and MFI all had low values. This is indicative of poor coupling and low fluidity/high viscosity, leading to manufacturing problems.

Comparative samples 2 and 5, on the one hand, and 3 and 6, on the other hand, display higher (improved) elongation and tensile strength, indicative of improved coupling, but still have low MFI values, indicative of low fluidity/high viscosity, which leads to manufacturing problems. This improvement in coupling is moreover associated with a relatively high cost due to the cost of the coupling agent and high processing costs.

Samples 4 and 7 according to the invention show a good/high elongation and tensile strength indicative of adequate/good coupling, combined with high MFI (high fluidity, low viscosity) and substantially lower cost on account of the low cost of the coupling agent and the lower processing costs.

It can be seen from Table 2 that the invention in particular provides a flame retardant polymer composition combining an elongation at break above 20, a tensile strength above 11 and a MFI well above 3, in particular above 3.3, all measured as indicated hereinabove.

The invention claimed is:

1. A flame retardant, halogen-free polymer composition comprising a blend of the following components:
   (1) a polyolefin selected from the group consisting of (a) an ethylene vinyl acetate containing 25-90% by weight ethylene and 10-75% by weight vinyl acetate, (b) a linear low density polyethylene, (c) a low density polyethylene, (d) a very low density polyethylene, (e) a high density polyethylene, and mixtures thereof;
   (2) a coupling agent comprising (f) from about 10 to about 50 by weight of a copolymer consisting of copolymerized ethylene and monoethyl maleate (EMAME) and (g) from about 50% by weight to about 90% by weight of an ethylene-based polymer; and
   (3) an inorganic flame retardant filler.

2. The composition according to claim 1 wherein the ethylene-based polymer of sub-component (g) is selected from a high density polyethylene (HDPE); low density polyethylene (LDPE); linear low density polyethylene (LLDPE); ultra low density polyethylene (ULDPE); copolymers of ethylene and alpha-olefin monomer prepared using a metallocene catalyst (metallocene polyethylene, or MPE); ethylene/propylene copolymer; and terpolymers such as ethylene/propylene/diene monomer (EPDM).

3. A shaped article formed from a composition according to claim 1.

4. The composition according to claim 1 wherein the component (3) is aluminum trihydrate, magnesium hydroxide, calcium carbonate, calcinated clay, talcum, ammonium polyphosphate or a mixture thereof.

5. A composition of claim 1 wherein the polyolefin is present in the flame retardant, halogen free polymer composition in an amount of 5-35% by weight, based on the total weight of said polymer composition.

6. A composition of claim 1 wherein the polyolefin is present in the flame retardant, halogen free polymer composition in an amount of 10-20% by weight, based on the total weight of said polymer composition.

7. A composition of claim 1 wherein the copolymer of subcomponent (f) is present in the coupling agent in an amount of from about 10 to about 45% by weight, based on the total weight of the coupling agent.

8. A composition of claim 1 wherein the copolymer of subcomponent (f) is present in the coupling agent in an amount of from about 15 to about 40% by weight, based on the total weight of the coupling agent.

9. A composition of claim 1 wherein the copolymer of subcomponent (g) is a linear low density polyethylene.

10. The composition according to claim 1 wherein the ethylene-based polymer of sub-component (g) is an ethylene copolymer selected from the group consisting of ethylene alkyl acrylate copolymers, ethylene alkyl methacrylate copolymers, ethylene vinyl acetate copolymers, and mixtures thereof.

11. A composition of claim 1 wherein the coupling agent component (2) is present in the flame retardant halogen free polymer composition in an amount of from 1-50% by weight of the total weight of components (1), (2) and (3) of said polymer composition.

12. A composition of claim 11 wherein the coupling agent component (2) is present in the polymer composition in an amount of from 1-15% by weight of the total weight of components (1), (2) and (3).

* * * * *